United States Patent [19]

Stiles

[11] 4,399,940
[45] Aug. 23, 1983

[54] AUTOMATIC STOVE DAMPER CONTROL

[76] Inventor: Donald E. Stiles, Rte. 1, Honor, Mich. 49640

[21] Appl. No.: 371,065

[22] Filed: Apr. 23, 1982

[51] Int. Cl.³ .............................................. G05D 23/08
[52] U.S. Cl. ............................... 236/1 G; 236/101 D; 267/175
[58] Field of Search .......................... 236/1 G, 101 D; 248/206.5; 374/206; 337/349, 362; 267/175, 177

[56] References Cited

U.S. PATENT DOCUMENTS

| | | |
|---|---|---|
| 121,639 | 12/1871 | Marriott . |
| 364,888 | 6/1887 | Barton . |
| 1,143,422 | 6/1915 | Meador . |
| 1,585,319 | 5/1926 | Tupper . |
| 1,720,522 | 7/1929 | Ludwick . |
| 2,107,809 | 2/1938 | Warner . |
| 2,187,767 | 1/1940 | Akers . |
| 2,241,108 | 5/1941 | Akers . |
| 2,285,446 | 6/1942 | Kronmiller ........................ 337/349 |
| 2,319,563 | 5/1943 | Shaw ............................ 337/349 X |
| 2,364,144 | 12/1944 | Hunsaker . |
| 3,050,601 | 8/1962 | Bohn . |
| 3,254,528 | 6/1966 | Michael ...................... 248/206.5 X |
| 3,366,333 | 1/1968 | Diehl ......................... 236/101 D X |
| 3,746,177 | 7/1973 | Vilotti ....................... 248/206.5 X |
| 3,777,974 | 12/1973 | Sparks . |
| 4,039,082 | 8/1977 | Ladinsky ..................... 248/206.5 X |
| 4,079,884 | 3/1978 | Sherman ............................ 236/1 G |
| 4,175,695 | 11/1979 | Cresswell ......................... 236/1 G |
| 4,236,668 | 12/1980 | Prikkel ............................. 236/1 G |

Primary Examiner—William E. Tapolcai
Attorney, Agent, or Firm—Price, Heneveld, Huizenga & Cooper

[57] ABSTRACT

An automatic stove damper having a temperature responsive element which activates a damper plate, the temperature responsive element being oriented by a movable adjustment means. The device allows for easy adjustment of the relative amount of damping provided by the device by shifting the adjustment means, but if the damper plate reaches and is stopped at a fully closed position the adjustment means is allowed to shift, preventing further temperature increases from permanently deforming the temperature responsive element. The adjustment means can release the temperature responsive element to quickly shift the damper plate to a fully damped position. In other aspects of the application a metal ring is attached to a stove pipe, with a magnet being positioned thereupon for orienting the temperature responsive element to provide the desired amount of relative damping. A counterweight urges the damper plate to a fully closed position when the magnet releases the temperature responsive element.

21 Claims, 5 Drawing Figures

AUTOMATIC STOVE DAMPER CONTROL

BACKGROUND OF THE INVENTION

Automatic stove dampers or draft inlets are used to control the heat loss and heat output of a stove by regulating the flow of flue gases from the combustion chamber. In some prior art automatic dampers a bimetallic element has been placed either within the furnace flue exhaust or in close enough proximity thereto so that increases in the temperature of the flue gases cause the bimetallic element to deform and regulate the position of the damper.

Although some automatic damper controls allow for the adjustment of the bimetallic element in order to compensate for the relative temperature of the surrounding area, these temperature controls do not allow for the quick and easy release of the adjustment system so that the stove can be fully damped at will, such as is desired when the stove is not in use or very little heat is called for. Additionally, previous stove damper controls making use of a bimetallic strip confine one end of the strip. If the damper is restrained from moving, such as might occur when the damper is fully open or fully closed, further temperature changes will continue to cause the bimetallic element to deform. As the one end of the bimetallic strip is confined and the other end is interconnected with the damper plate which cannot move further, this continued bending of the bimetallic element will permanently deform the strip. As a result, after the temperature variance is reduced the bimetallic element will not return to its original configuration and therefore the character and adjustment of the damper control device is changed.

SUMMARY OF THE INVENTION

Applicant's invention is drawn to an automatic damper or draft control which regulates the draft or ventilation through the stove exhaust pipe connected to the stove's combustion chamber. The damper control is temperature responsive so that as the temperature in the vicinity of the device increases the damper plate is automatically adjusted in the flue passageway to regulate the draft through the stove pipe. This adjustment of the damper position regulates combustion so as to give off an even and uniform heat and prevent the stove from overheating.

The device of the present application provides a stove damping control which permits the easy adjustment of the relative amount of damping while also allowing the damper to be quickly and easily placed in the fully damped position, such as is required when the stove is not in use or a very low rate of burning is desired. Further, applicant's invention protects against the permanent deformation of the different elements of the damper control such that even if temperatures continue to increase after the damper is placed in a fully closed position the controlled device will not be damaged.

The present application is drawn to a temperature responsive element which is interconnected with and regulates a damper plate which in turn regulates the draft of the stove. An adjustment means movably positions the temperature responsive element, and a counterbalance is attached to the damper plate axle exerting a torque upon it. In a more specific embodiment, the adjustment means is a magnet which can be attached to a base element, such as a metal ring mounted on a stove pipe, allowing the magnet to be positioned at various points on the base element. One end of the temperature responsive element, in this case a bimetallic element, is attached to the axle which carries the damper plate, and the other free end is magnetically held by the magnet. As the magnet's position on the base element is adjusted the temperature responsive element rotates and thereby adjusts the relative amount of damping provided by the control.

Thus, this invention provides an automatic damper or draft control which can be quickly and easily adjusted to vary the relative amount of damping by simply shifting the magnet's position on the base element. In one embodiment, when the temperature responsive element is disconnected from the magnet the counterbalance causes the damper plate to close. In a second embodiment of the invention the counterbalance is positioned to urge the damper plate into an open position when the temperature responsive element is disconnected and allow the free flow of air through the stove pipe. Further, when the damper plate is restrained from moving, such as when it reaches a stop at the fully closed position, and further temperature increases cause the temperature responsive element to continue bending the magnet will shift on the base element with the bending of the temperature responsive element, keeping that element from permanently deforming. Such permanent deformations would change the responsive character of the damper control. These and other features, objects and advantages of the present invention will become apparent upon reading the following description thereof together with reference to the drawings in which:

DETAILED DESCRIPTION OF THE PREFERRED EMBODIMENT

Figure 1:
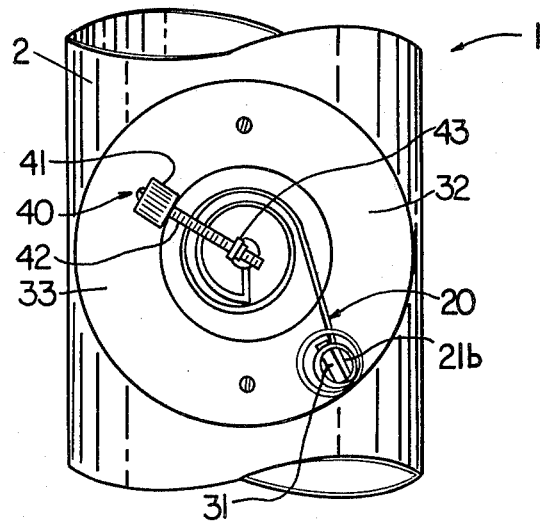
FIG. 1 is a front elevational view of the fully open position of the stove damper control embodying the present invention.

The present invention comprises an assembly 1 which includes a section of a stove pipe 2, a circular ring-shaped mounting plate 33 mounted on stove pipe 2, a damper plate 10 pivotally mounted on the axle 11, and an automatic control sub-assembly 20 attached to axle 11 for automatically adjusting the rotation position of damper plate 10 for regulating the draft of the stove. Stove pipe 1 is of any conventional type constructed of sheet metal.

Damper plate 10 also is conventional. It is pivotally mounted by axle 11 inside of stove pipe 1, so that as the automatic damper control operates, damper plate 10 shifts between a fully open position, shown in FIG. 3, and a fully closed position, shown in FIG. 4. When in a fully opened position damper plate 10 allows the free flow of air through stove pipe 1 for maximum combustion while in the fully closed position damper plate 10 obstructs the air flow through stove pipe 1.

Figure 3:
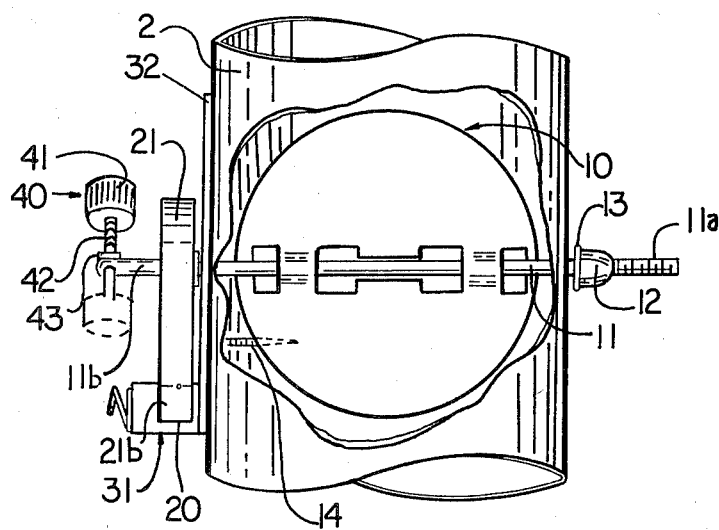
FIG. 3 is a side elevational view of the fully open position of the stove damper control embodying the present invention.
Figure 4:
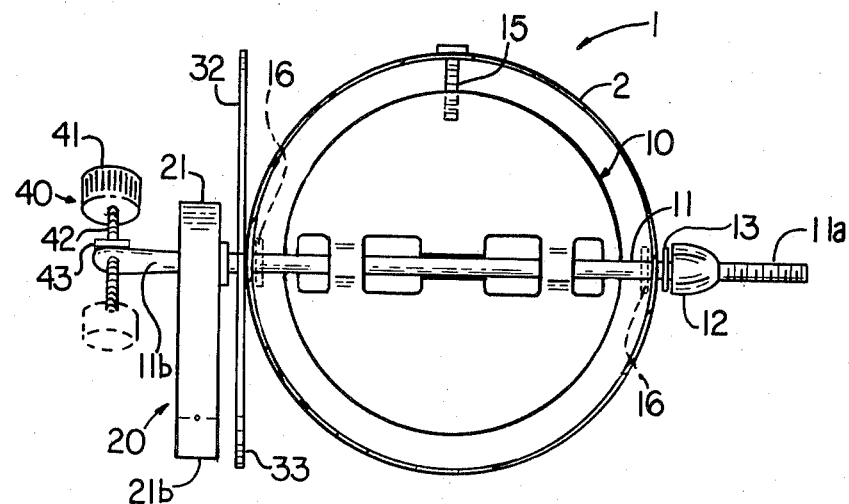
FIG. 4 is a top plan view of the damper control in a fully closed condition.
Figure 5:
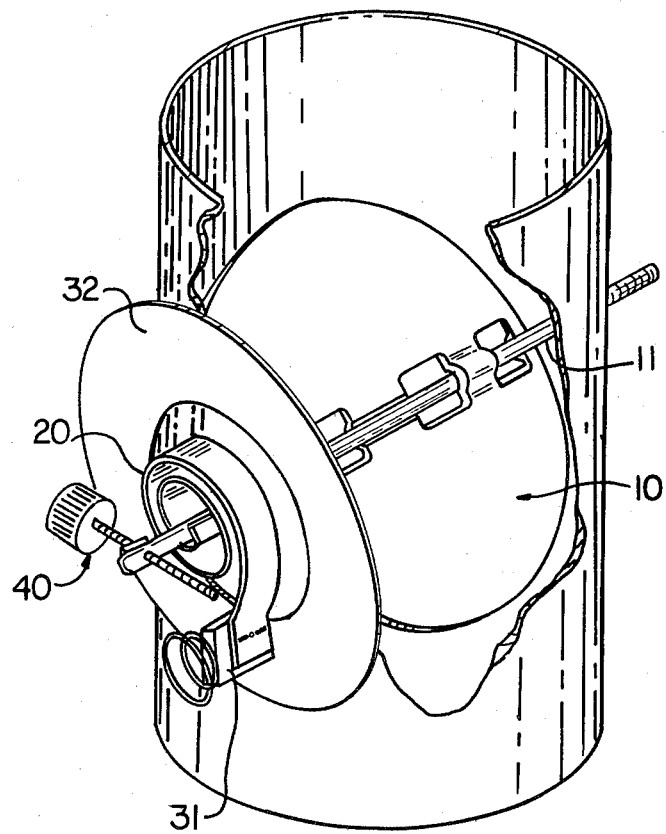
FIG. 5 is a perspective view partially broken away of a stove damper having an open position setting of the stove damper control, but deformation of the temperature responsive element has placed the damper plate in a partially open position.

Damper plate 10 is attached to and suspended within stove pipe 1 by axle 11, with the ends of axle 11 extending through the wall of stove pipe 1. One end 11a of axle 11 is threaded to receive washer 13 and nut 12. In the alternate to washer 13 and nut 12, spacer washers 16 can be carried on axle 11 inside of and in abutment with the stove pipe walls to prevent axle 11 from sliding longitudinally within the stove pipe, as shown in FIG. 4 in phantom. The other end 11b of axle 11 extends out through the opposite side of stove pipe 1 and is adapted for carrying the automatic stove damper control. Screw 14 in stove pipe 1 forms a stop which damper plate 10 abuts when in the fully opened position, as shown in FIG. 3. Another screw 15 forms a second stop which abuts damper plate 10 when in the fully closed position and keeps it from pivoting further as shown in FIG. 4. Since damper plate 10 has several large holes through it and has a diameter smaller than the inside diameter of stove pipe 1, plate 10 does not completely obstruct the flow of flue gases through stove pipe 1, even when in the fully closed position.

The automatic control sub-assembly 20 comprises a helical-shaped bimetallic strip 21 which has one end attached to axle 11 and a free radially extending leg or end 21 having a bent portion 21b which is magnetically attached and under normal conditions held by a magnet 31 as will be discussed hereinafter. This construction provides means for adjustably fusing the leg 21b so that the draft created by the damper at different temperatures can be adjusted thus providing infinite calibration of the damper. Strip 21 has a number of helical turns coiling around the axle 11.

Figure 2:
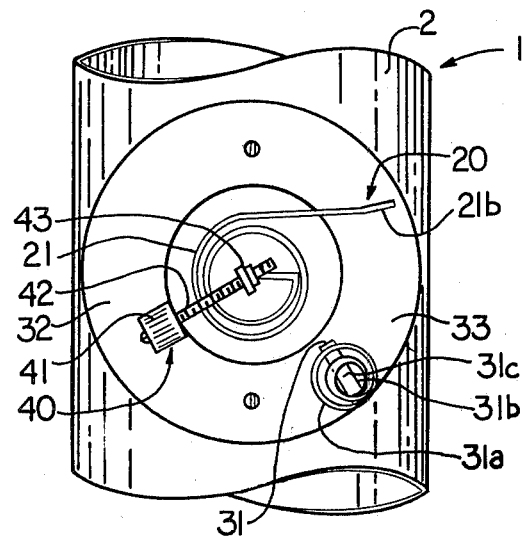
FIG. 2 is a front elevational view of the stove damper control in the fully closed condition.

In the preferred embodiment base element 32 is a circular metal ring 33 affixed to stove pipe 1 to encircle axle 11 at a distance equal to the distance end 21b extends from axle 11, as shown in FIGS. 1 and 2. When magnet 31 is magnetically attracted to ring 33 it magnetically holds end 21b of bimetallic strip 21 in a fixed position which will not vary unless the magnet is moved by an operator or the force exerted by the bimetallic element closely approaches a stress which would deform the coil. Slightly before this stress point the magnetic force is not sufficient to prevent the magnet from sliding. Magnet 31 is a ceramic magnet and retains its magnetic properties when subjected to high temperatures. Handle 31a is a metallic coil which is attached to magnet 31, which serves to dissipate the heat transmitted to magnet 31 and allows magnet 31 to be adjusted without injury to an operator's hands. Magnet 31 is rectangular in shape having faces 31b and sides 31c. A face 31b contacts ring 33 to magnetically connect magnet 31 to ring 33. Strip 21 is then rotated until end 21b contacts a side 31c of magnet 31 thereby magnetically positioning strip 21.

End 11b of axle 11 has a hole therein which is threaded for receiving counterweight 40. Counterweight 40 includes a weight 41 carried on threaded weight arm 42 which passes through the hole in axle 11 with locking nut 43 fixing counterweight 40 in position. The threaded weight arm 42 permits adjustment of the position of the weight relative to the axis of axle 11 for adjusting the torque the weight exerts on the axle in opposition to the force exerted by the bimetallic element 21, such counteracting torque preventing the flattening of the damper.

OPERATION

With the above description and drawings the operation of the damper control becomes apparent. When a given amount of damping is desired, such desired damping being, for example, the amount desired when the surrounding area is at normal room temperature, magnet 31 is slidably positioned on ring 33 such that the bimetallic strip 21 which is attached to magnet 31 damper plate 10 is at an angle to produce desired damping. Subsequently, if the combustion in the stove reaches too high a level and the stove is too hot, the flue gases within stove pipe 1 will accordingly increase in temperature and transmit the heat to bimetallic strip 21. Bimetallic strip responds in a conventional fashion by bending or changing configuration due to a differential in the expansion of the metal which, since end 21b is fixed by magnet 31 to ring 33, produces a torque on axle 11 to rotate damper 10 and shift it to a more closed position. This damps back the fire within the stove and as the temperature of the flue gases within stove pipe 1 is lowered bimetallic strip 21 returns to its original configuration.

Damper plate 10 is restrained from pivoting past the fully closed position by stop 15 so that further increases in temperature will not begin to reopen the damper. If damper 10 is in the fully closed condition and the temperature of the flue gases within stove pipe 1 continues to increase, the increase will further bend bimetallic strip 21. At a point below the stress point of the bimetallic strip, at which point the strip would be permanently deformed, the holding force of magnetic attraction of magnet 31 will be exceeded and magnet 31 will slide on ring 33 instead of bimetallic strip 21 being permanently deformed. This prevents damage to bimetallic strip 21.

If the stove is not in use or is desired to be fully damped, such as at night, bimetallic strip 21 can easily be disconnected from magnet 31 by pushing on the counterweight 40 with sufficient force to overcome the magnetic holding force of the magnet 31 on the end 21c of bimetallic strip 21. Having disengaged end 21c from magnet 31 the counterweight 40 will cause damper plate 10 to pivot into a fully closed position abutting stop 15 and hold it in that position. Further, when the damper is to be returned to its original calibrated position, the damper can be rotated until end 21c of strip 21 engages and is held in position by magnet 31. Thus, this invention not only provides a means of easily calibrating the damping of the stove but also provides an easy and simple way of closing the damper and there-after returning it to the original calibrated position.

In a second embodiment of the invention, counterweight 40 is extended away from axle 11 so as to urge the damper plate into an open position when end 21c is disengaged from magnet 31. Counterweight 40 extends from axle 11 in a direction one hundred and eighty degrees from that described above, shown in FIG. 4 in phantom. In this embodiment magnet 31 must contact the side of end 21c opposite to that described above, so that end 21c is free to pivot downward in relation to drawings 1 and 2 without being blocked in its movement by the magnet. This causes the automatic stove damper control to fall in a normally open position.

It will become apparent to those skilled in the art that various modifications to the preferred embodiment of the invention disclosed herein can be made without departing from the spirit or scope of the invention as defined by the appended claims, such as mounting the base element to a different structure.

The embodiments of the invention in which an exclusive property or privilege is claimed are as follows:

1. An automatic stove damper assembly, comprising:
   a damper plate disposed to damp a stove pipe;
   a temperature responsive element having a configuration which changes when the temperature surrounding said response element changes, said temperature response element being operatively connected to said damper plate to change damping position thereof, so that as said configuration of said thermal response element changes the position of said damper plate is changed;
   adjustment means movably related to said temperature response element for releasably and movably orienting said temperature response element, to that moving said adjustment means changes the orientation of said temperature responsive element in relation to said damper to change the position of said damper at predetermined different temperatures for calibrating the operation of said damper.

2. An automatic stove damper assembly as described in claim 1, further comprising a counterweight related to said damper plate so that when said adjustment means releases said temperature responsive element said counterweight activates said damper plate.

3. An automatic stove damper assembly as described in claim 1 or 2 wherein:
   said adjustment means comprises a magnet and a metal base element, said magnet being magnetically attachable to said base element and also being magnetically attachable to said temperature response element.

4. An automatic stove damper assembly as described in claim 3, wherein:
   said damper plate is mounted on an axle; and
   said base element is a metal ring which encircles said axle.

5. An automatic stove damper assembly as described in claim 3, wherein:
   said temperature response element is a bimetallic strip having a first end attached to said axle and a second end extending away from said axle to said magnet; said magnet being magnetically attached to said metal base and said second end simultaneously.

6. An automatic stove damper assembly as described in claim 4, wherein:
   said temperature response element is a bimetallic strip having a first end attached to said axle and a second end extending away from said axle to said magnet; said magnet being magnetically attached to said metal base and said second end simultaneously.

7. An automatic stove damper assembly as described in claim 1, wherein:
   said temperature responsive element is a bimetallic strip having a free end and said adjustment means relates to said free end of said strip.

8. An automatic stove damper assembly as described in claim 7, further comprising a counterweight related to said damper plate so that when said adjustment means releases said temperature responsive element said counterweight activates said damper plate.

9. An automatic stove damper assembly as described in claim 7 or 8, wherein:
   said adjustment means comprises a magnet and a metal base element, said magnet being magnetically attachable to said base element and also being magnetically attachable to said temperature response element.

10. An automatic stove damper assembly as described in claim 9, wherein:
    said damper plate is mounted on an axle; and
    said base element is a metal ring which encircles said axle.

11. An automatic stove damper assembly, comprising:
    a damper plate disposed to damp a stove pipe;
    a temperature responsive element having a configuration which changes when the temperature surrounding said response element changes, said temperature response element being operatively connected to said damper plate to changing damping position thereof, so that as said configuration of said thermal response element changes the position of said damper plate is changed;
    adjustment means movably related to said temperature response element for releasably and movably orienting said temperature response element, so that moving said adjustment means changes the orientation of said temperature responsive element, said adjustment means being moved sufficiently easy that said changes in configuration of said temperature response element will move said adjustment means if said damper plate is restrained from movement;
    whereby changes in temperature surrounding said temperature responsive element cause said damper plate to be moved, but if said damper plate is restrained from activation changes in temperature cause said adjustment means to move, and said adjustment means allows for the release of said temperature responsive element.

12. An automatic stove damper assembly as described in claim 11, further comprising a counterweight related to said damper plate so that when said adjustment means releases said temperature responsive element said counterweight activates said damper plate.

13. An automatic stove damper assembly as described in claim 11 or 12, wherein:
    said adjustment means comprises a magnet and a metal base element, said magnet being magnetically attachable to said base element and also being magnetically attachable to said temperature response element.

14. An automatic stove damper assembly as described in claim 13, wherein:
    said damper plate is mounted on an axle; and
    said base element is a metal ring which encircles said axle.

15. An automatic stove damper assembly as described in claim 13, wherein:
    said temperature response element is a bimetallic strip having a first end attached to said axle and a second end extending away from said axle to said magnet; said magnet being magnetically attached to said metal base and said second end simultaneously.

16. An automatic stove damper assembly as described in claim 14, wherein:
    said temperature response element is a bimetallic strip having a first end attached to said axle and a second end extending away from said axle to said magnet; said magnet being magnetically attached to said metal base and said second end simultaneously.

17. The automatic stove damper assembly of claims 1 or 11 in which:

said stove pipe has two stop means for limiting said damper plate from pivoting beyond said full open and full closed positions.

18. The automatic stove damper assembly of claim 3 in which:
said stove pipe has two stop means for limiting said damper plate from pivoting beyond said full open and full closed positions.

19. The automatic stove damper assembly of claim 5 in which:
said stove pipe has two stop means for limiting said damper plate from pivoting beyond said full open and full closed positions.

20. The automatic stove damper assembly of claim 15 in which:
said stove pipe has two stop means for limiting said damper plate from pivoting beyond said full open and full closed positions.

21. The automatic stove damper assembly of claim 16 in which:
said stove pipe has two stop means for limiting said damper plate from pivoting beyond said full open and full closed positions.

* * * * *